United States Patent Office 3,144,617
Patented Aug. 11, 1964

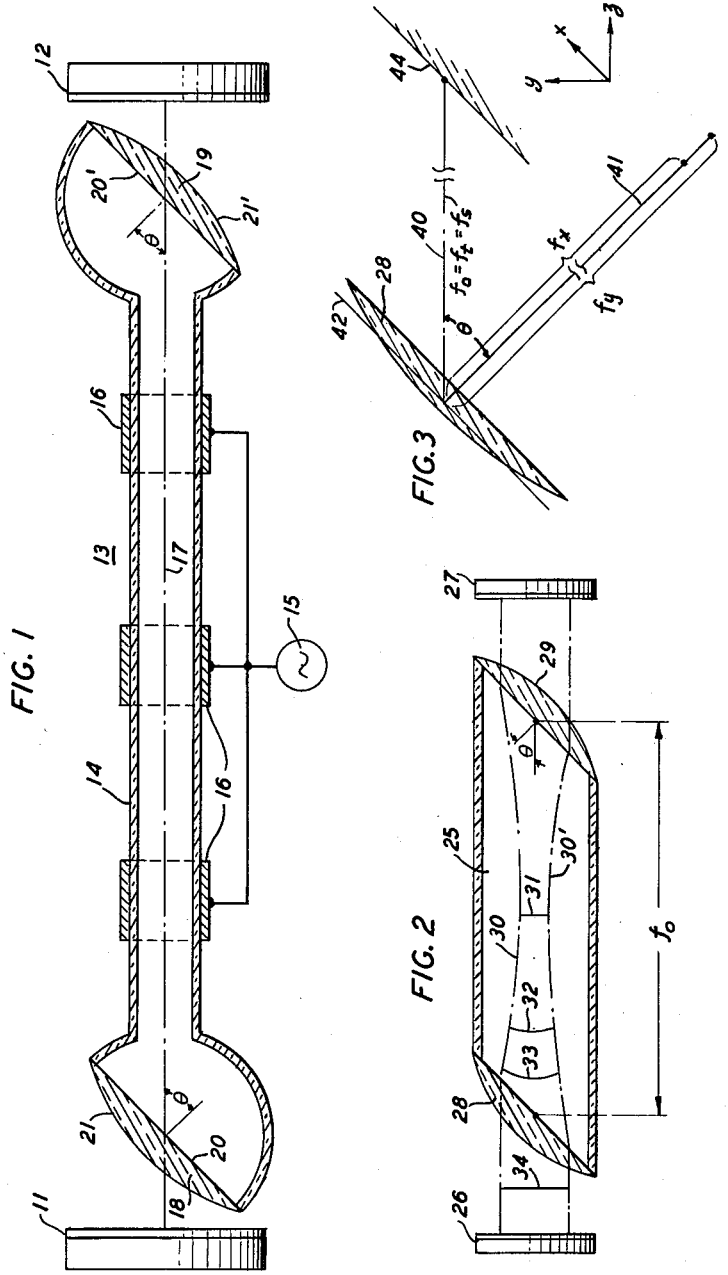

3,144,617
OPTICAL MASER WITH CONVEX NEGATIVE
TEMPERATURE MEDIUM EXTREMITIES
Herwig W. Kogelnik, Summit, and William W. Rigrod,
Millington, N.J., assignors to Bell Telephone Laboratories, Incorporated, New York, N.Y., a corporation of
New York
Filed Dec. 29, 1961, Ser. No. 163,135
12 Claims. (Cl. 331—94.5)

This invention relates to optical masers and more particularly to optical masers using interferometer means as a cavity resonator.

It is now well known that amplification of electromagnetic wave energy can be achieved by stimulated emission from media in which there is produced a population inversion in a characteristic energy level system. Such media are generally referred to as negative temperature, or maser, media, and the amplification process is termed maser action. One way in which to improve the efficiency of the interaction between the wave to be amplified and the negative temperature medium is to cause the wave to resonate in a cavity of appropriate dimensions which contains the medium. At optical frequencies, the wavelengths involved are too small, however, to permit cavity dimensions of the order of a wavelength, as is typically the procedure at microwave frequencies. Accordingly, it has been necessary to utilize cavities having dimensions which are thousands of times larger than the energy wavelengths involved.

One such structure which has been successfully employed in an optical maser is the Fabry-Perot interferometer comprising two plane parallel reflective surfaces separated by a gap of convenient length. A second such structure comprises an interferometer cavity employing concave spherical reflective surfaces also separated by a convenient gap. The surfaces in both cases are so positioned with respect to each other and with respect to the negative temperature medium that light waves are multiply reflected between the mirrors, traveling through the medium on each passage therebetween. During the passage of a wave through the active maser medium, it is amplified by interaction with the excited atomic or molecular resonators therein. In addition, attenuation due to scattering by inhomogeneities in the medium occur. At the reflective surfaces, additional energy is lost due to the finite conductivity thereof and due to diffraction effects at the surface edges. It is apparent of course that the usefulness of the maser depends upon the fact that the associated energy losses can be made less than the energy gain provided by the maser action.

In the optical maser field, the operative devices may be classified as either solid state masers, of which the ruby maser is an example; or gaseous masers, of which the helium-neon maser is an example. It is with respect to the gaseous maser that the present invention has primary utility, although solid state embodiments can be devised in accordance with the invention.

In the past, maser action in the gas optical maser has occurred in an elongated discharge tube situated between external reflecting surfaces, the ends of the discharge tube being formed as low reflection, low loss output window structures oriented at the Brewster angle with respect to the tube axis. Thus waves originating in the gas discharge travel axially within the tube, exit at one end window and, upon incidence on the external reflecting surface, are reflected back through the window into the tube where amplification occurs as the waves traverse the maser medium. Typically, at least one of the reflecting surfaces is partially reflective and partly transmissive to permit abstraction of the amplified waves from the interferometer. The exiting beam typically comprises a plurality of nearly single frequency beams comprising coherent, or in-phase, electromagnetic waves characterized by wavelengths in the $10^{-2}$ to $10^{-6}$ centimeter region. By the use of well known methods and means, the output can be made essentially single frequency.

Typically, the output window structures of the prior art are nominally flat, and are supplied as optically flat plane parallel surfaced plates. It has been observed, however, that in practice the performance of flat window gas maser structures is below the level considered to be practical for many research applications involving instrumentation techniques and the like. Specifically, it has been observed that severe beam aberrations are introduced by the nominally flat output windows. These aberrations can be ascribed to distortions of the flat plates produced by sealing to the glass discharge envelope and by evacuation thereof. As a result, the nominally flat windows become weak concave meniscus lenses, producing beam divergence and astigmatic beam distortion. As a result of the losses introduced by the beam divergence, oscillations utilizing external plane reflective surfaces are difficult to sustain. Likewise, due to the astigmatic distortion introduced by the oblique incidence of the beam upon the essentially spherical concave lens, the intensity distribution of the beam is different along planes normal to and parallel to the plane of polarization of the electric field of the coherent waves.

It is therefore an object of the present invention to improve the performance of an optical maser in an interferometer cavity comprising plane reflectors external to the maser medium.

It is a more specific object of the invention to reduce beam aberrations caused by the passage of the maser beam through the output windows of a gas maser discharge tube.

In the operation of prior art optical masers in resonant environments in which the beam reflecting surfaces are external to the maser medium, the quality and positioning of the external mirrors is of great importance. Thus, the surfaces of the mirrors are advantageously flat within one twentieth of a wavelength at the frequency of operation, and the positioning of the mirrors is preferably parallel within a similar tolerance. It can easily be appreciated that, at the wavelengths involved, considerable difficulty is encountered in meeting these requirements.

It is therefore a further object of the present invention to reduce the effect of departures of the external mirrors from optical flatness and from parallelism.

In accordance with the invention, the above objects are realized in a preferred embodiment comprising a gaseous optical maser medium having a central axis disposed between external reflecting surfaces disposed on said axis and normal thereto. The axial extremities of the gaseous maser medium comprise output windows of converging lens design disposed at the Brewster angle with respect to said axis. More particularly, the output windows comprise convex lenses having bi-cylindrical curvature. In this specification, the description of a lens as bi-cylindrical is intended to mean that at least one lens surface is characterized by different radii of curvature in two orthogonal planes which pass through the lens center.

A further advantage of the invention is the reduction in maser beam transmission loss afforded by the use of convex lenses which, because of their convexity, can be made thinner than flat windows and retain the same physical strength.

The above and other objects of the invention, its features, and its mode of operation can be more readily understood from reference to the accompanying drawing and the detailed description thereof which follows.

In the drawing:

FIG. 1 is a longitudinal cross sectional view of an optical maser in accordance with the present invention;

FIG. 2 is a diagrammatic representation of the operation of an optical maser in accordance with the invention; and FIG. 3, given for purposes of explanation, illustrates a convex lens maser output window.

Referring more particularly to FIG. 1, there is illustrated a gas optical maser in accordance with the invention comprising an interferometer cavity resonator formed by reflective surfaces 11, 12, at least one of which is advantageously partially transmissive to permit the abstraction of energy therefrom.

Reflectors 11, 12 each comprise, for example, a plate of optical quality glass having a plurality of layers of dielectric material disposed on the surface thereof facing the opposite reflector. Typically, these dielectric layers alternately comprise magnesium fluoride and zinc sulfide and are each one quarter wavelength thick at the operating frequency. An optimum of thirteen such layers has been found from reflection and absorption considerations. The transmittance of such layers is typically of the order of 0.3%.

Disposed within the cavity is an elongated negative temperature medium 13 having a typical length of 100 centimeters and comprising a mixture of gases characterized by an appropriate energy level system for maser action contained in a glass envelope 14 having a central axis 17. Advantageously, the energy level system includes a pair of levels between which a metastable population inversion may be at least intermittently established, the return of this system to normal equilibrium upon proper stimulation being accompanied by the emission of linearly polarized electromagnetic wave energy in the optical frequency range. Thus, for example, a mixture of helium and neon gases can be used. In the operation of such a device, radio frequency pump energy from source 15 is applied to the gas mixture by means of electrode 16, causing an electrical discharge to flow in the gas mixture within envelope 14. The energy from the internal discharge excites the helium atoms to an upper metastable energy level from which, normally, no radiation would occur. The neon atoms in the gas mixture, however, collide with the excited helium atoms, and the energy of the latter is transferred preferentially to the upper metastable energy level of the neon atoms by the collision process. These neon atoms can then be stimulated to radiate energy in a continuous stream, the resultant energy beam being reflected back and forth between reflective end plates 11, 12, growing in intensity on each traversal of the negative temperature medium. During each passage of the stimulated energy beam between reflectors 11, 12 a traversal of output windows 18, 19 occurs. In accordance with the invention, output windows 18, 19 comprise convex lenses such as planoconvex lenses having bi-cylindrical curvature to be more fully set out hereinafter. Windows 18, 19 are sealed to glass envelope 14, advantageously by an operation involving heating the end of envelope 14 and the edges of lenses 18, 19 sufficiently to cause a fusion of the molten material. The output windows advantageously comprise a high quality homogeneous optical glass, of which Corning #7056 and Bausch and Lomb #BSC-51 are typical examples.

As stated hereinabove, windows 18, 19 are inclined to the axial beam path at an acute angle known in the art as the Brewster angle $\theta$ which is given by the relation $$\theta = \tan^{-1} n$$

where $n$ is the refractive index associated with the lens material. For Corning glass #7056, $n$ is approximately 1.48, and $\theta$ is therefore, approximately equal to 56°. It is a characteristic of the Brewster angle that incident light having its plane of polarization in the plane of incidence is substantially free of surface reflection, whereas energy incident with its plane of polarization normal to the plane of incidence suffers a substantial reflection loss. It may easily be appreciated that, with respect to plane surfaces 20, 20' of lenses 18 and 19 respectively, the Brewster angle relationship holds everywhere, while with respect to convex surfaces 21, 21' respectively, the numerical value of the angle between the surfaces and the axial path 17 varies. However, the amount of light reflected at an interface increases very slowly as the angle of incidence deviates from the Brewster angle and therefore reflections are minimized. As will be seen hereafter, the curvature of surface 21, 21' is of low value and therefore, as a practical matter, $\theta$ varies only slightly even in view of the curvature.

A pictorial understanding of the operation of an optical maser in accordance with the present invention can perhaps be better gained from reference to FIG. 2 in which negative temperature medium or maser medium 25 is disposed within an interferometer cavity comprising reflective end plates 26, 27. Each extremity of the maser medium terminates in plano-convex output window lenses 28, 29 disposed at the Brewster angle $\theta$ to the maser axis. The lens centers are separated by a distance $f_0$, which as will be more completely set out hereinafter, is the focal length in the preferred embodiment of lenses 28, 29 along the maser axis. In the operation of the optical maser of FIG. 2, the medium 25 is stimulated to emit coherent optical frequency energy, which travels axially within medium 25, and is iteratively reflected at end plates 26, 27, which are typically separated from windows 28, 29 along the maser axis a distance small compared to $f_0$. In steady state operation, the reflected energy can be illustrated as being confined, in medium 25, within the volume between broken lines 30, 30'. One effect of lenses 28, 29 is to narrow the radius of illumination of the beam toward the center of the medium, this effect being the result of the focusing properties of the windows. The region of maximum concentration occurs at the center of the medium due to the selection of focal lengths of the windows to be substantially equal to their separation $f_0$. It should be noted that a focal length $f_0$ rather than $f_0/2$ is employed. This focal length produces beam focusing at the center of the maser medium due to the behavior of the convex lens-plane mirror combination as a single concave mirror having its focal point at the center of the maser medium. These focal length considerations are set out in detail in an article by G. D. Boyd and J. P. Gordon, entitled "Confocal Multimode Resonator for Millimeter Through Optical Wavelength Masers," and appearing in the Bell System Technical Journal, March 1961, at page 489. Within the medium 25 and generally confined between lines 30, 30' is the maser beam, which comprises optical frequency coherent electromagnetic waves characterized by wave fronts, velocities of propagation, polarization, and the like. The nature of the wave fronts are of particular importance in accordance with the present invention. At the center of the medium 25, the wave fronts are generally plane, lying normal to the maser axis, as indicated by wave front 31. As the extremities of the maser medium are approached, however, the wave fronts become spherical in the manner of wave front 32 and this curvature increases with distance away from the maser center. Thus wave front 33 is characterized by greater curvature than wave front 32. Considering now the external volume in which propagation occurs between the maser medium and the external plane reflecting surfaces, it is desirable that the wave fronts be plane parallel as indicated by front 34. This requirement stems from the plane nature of reflectors 26, 27 and the desirability that the waves be incident at all locations normal thereto. In order for the wave fronts, which are curved within the maser medium, to be plane external thereto, it is necessary for a transformation to occur.

Such a transformation is imparted by bi-cylindrical lens windows 28, 29. By virtue of the transformation from spherical wave fronts to plane wave fronts, the energy is incident upon and reflected from external mirrors 26, 27 with minimum diffraction losses. It can be easily appreciated that if windows 28, 29 formed divergent lenses, the energy beam would spread upon exiting maser medium 25 and this spread would be enhanced upon reflection. Thus, the energy in the beam would decrease due to diffraction losses and operation of the maser would be degraded. Since the properties of lenses 28, 29 are fixed, it can be seen that the effect of slight deviations of the external reflecting surfaces from parallelism will be minimized within the active medium itself. If, on the other hand, the windows are plane, the deviations are carried unchanged into the body of the maser.

The specific properties of windows 28, 29 can be more completely understood from reference to FIG. 3 in which a lens such as lens 28 of FIG. 2 is illustrated. A light beam having an axial path indicated by dashed line 40 is incident upon lens 28 at the Brewster angle $\theta$. Considering lens 28 as a thin spherical lens with principal plane 42 with reference to which the optical parameters are defined, the focusing properties thereof with respect to an obliquely incident light beam are well known, and are set out, for example, at pages 147–9 in the third edition of the textbook "Fundamentals of Optics" by Jenkins and White. In general, incident light is focused at two points along the beam axis; one associated with the tangential plane of incidence (in the plane of the drawing) and a second associated with the sagittal plane of incidence (in the plane normal to the plane of the drawing). Thus two focal lengths, $f_t$ and $f_s$ are defined. For Brewster angle ray incidence, $\theta$, $$\frac{1}{f_t} = \frac{1}{\cos \theta}(n^2 - 1)\left(\frac{1}{r_1} - \frac{1}{r_2}\right) \quad (1)$$

$$\frac{1}{f_s} = \cos \theta (n^2 - 1)\left(\frac{1}{r_1} - \frac{1}{r_2}\right) \quad (2)$$

where $n$ is the refractive index of the lens material and $r_1$ and $r_2$ are the radii of curvature of the two surfaces of the lens.

For zero angle incidence upon a thin spherical lens, i.e., for focusing along axis 41 in FIG. 3, $$\frac{1}{f} = (n-1)\left(\frac{1}{r_1} - \frac{1}{r_2}\right) \quad (3)$$

The tangential and sagittal focal lengths defined by Equations 1 and 2 can be expressed as functions of focal lengths along the axis 41 of zero angle incidence as follows:

$$\frac{1}{f_y} = \frac{\cos \theta}{n+1}\frac{1}{f_t} \quad (4)$$

$$\frac{1}{f_x} = \frac{1}{(n+1)\cos \theta}\frac{1}{f_s} \quad (5)$$

where $f_y$ is the focal length in the plane of the drawing and $f_x$ is the focal length in the plane normal to the plane of the drawing.

In order that the lens 28 have a single focal point rather than two such points along the beam axis 40, it is necessary that $f_t = f_s$. In accordance with the preferred embodiment of the invention not only are the tangential and sagittal focal lengths equated, but they are made equal to the separation $f_0$ between principal plane 42 of lens 28 and the principal plane 44 of the opposing lens. When the lenses are extremely thin, the principal planes are substantially identical to the lens surfaces, and $f_0$ corresponds to the lens separation. In this manner, the lens and mirror combination of FIGS. 1 and 2 is made confocal, thereby reducing further effects of the departure of the external mirrors from parallelism. Returning now to the descriptive equations, and specifically considering the plano-convex lens case in which radius $r_2$ is infinite, Equation 3 reduces to $$\frac{1}{f} = \frac{n-1}{r_1}$$

where $r_1$ describes the surface curvature of the convex surface of the lens. If $f_t$ and $f_s$ are to be equal to $f_0$ it is clear from Equations 4 and 5 that the focal lengths $f_x$, $f_y$ along axis 41 must be unequal. From Equations 4 and 5, therefore $$\frac{f_x}{f_y} = \cos^2 \theta \quad (6)$$

Thus the lens 28 has a bi-cylindrical surface characterized by surface curvatures in orthogonal planes which are different and which are related by $$r_x = (n^2 - 1)\cos \theta f_0 \quad (7)$$

$$r_y = \frac{n^2 - 1}{\cos \theta}f_0 \quad (8)$$

the ratio of $r_x$ to $r_y$ being also equal to $\cos^2 \theta$ in the confocal embodiment.

In one embodiment of the invention operative in the 1.15 micron wavelength range with a gas mixture of 10 mm. helium presure to 0.1 mm. neon pressure in a discharge tube of 15 mm. diameter, a pair of planoconvex lenses were separated a distance of 39.5 inches. The lenses comprised Corning #7056 glass having a refractive index of 1.479 and, therefore an associated Brewster angle of 55° 56'. The convex lens surface had a radius of curvature $r_y$ equal to 83 inches and a radius of curvature $r_x$ equal to 26 inches. Maximum lens thickness was 2 millimeters or approximately 79 mils.

While the invention has been described in a gas optical maser environment, solid state maser applications may readily be devised. In this respect, the ends of the solid maser material, ruby for example, are ground and polished as convex surfaces at the Brewster angle $\theta$ with orthogonal radii of surface curvature related by $\cos^2 \theta$. External mirrors aligned with the maser axis and forming an interferometer cavity complete the structure.

In the embodiment described above, the external reflecting surfaces have been exclusively planar. It is obvious, however, that one or more concave reflectors can be used in situations in which the simplicity of plane mirrors is not desired. Furthermore, greater versatility for some purposes is realizable in experimental devices when concave reflectors are used, since the effective focal length of the mirror-window lens combination can be varied by varying the nature of the external concave reflector.

It should also be noted that Brewster angle output windows have a concavo-convex configuration, rather than a plano-convex configuration can be used in gas maser embodiments. In such embodiments, both lens surfaces are bi-cylindrical in accordance with the invention, and the focal lengths along the axis of zero angle beam incidence are related by $\cos^2 \theta$.

Further variations of the invention involve the use of one concave lens window and one plane window in combination with two plane external reflecting surfaces or with one plane and one concave external reflecting surface.

In all cases, it is understood that the above described arrangements are merely illustrative of the many specific embodiments which can represent applications of the principles of the invention. Numerous and varied other arrangements can readily be devised in accordance with these principles by those skilled in the art without departing from the spirit an scope of the invention.

What is claimed is:

1. An optical maser comprising an elongated negative temperature medium characterized by a principal axis, means for applying pump energy to said medium for establishing a population inversion therein, an elongated optical interferometer resonant cavity comprising first and second external reflective end members, means for abstracting energy from said cavity, said negative temperature medium being disposed within said cavity and positioned with said axis substantially normal to said end members, the axial extremities of said medium comprising means for focusing optical energy, said focusing means having bi-cylindrical surface curvature.

2. The maser according to claim 1 in which said negative temperature medium is a gas mixture in a discharge tube and said focusing means comprise output windows.

3. The maser according to claim 2 in which said windows are disposed at the Brewster angle $\theta$ with respect to said principal axis.

4. The maser according to claim 3 in which said bi-cylindrical surface curvature is characterized by focal lengths along the axis of zero angle beam incidence related by $\cos^2 \theta$.

5. The maser according to claim 3 in which said windows are plano-convex lenses.

6. The maser according to claim 5 in which the radii of curvature of the curved surfaces of each of said lenses are related by $\cos^2 \theta$.

7. The maser according to claim 5 in which the focal lengths of said lenses along said principal axis are substantially equal to the separation of the lenses along said principal axis.

8. An optical maser comprising a gaseous optical maser medium having a central axis and disposed between external reflecting surfaces which are positioned on said axis and normal thereto, means for applying pump energy to said medium for establishing a population inversion therein, at least one of said surfaces being partially transmissive to permit the abstraction of energy incident thereupon, and optically transparent output windows forming the axial extremities of said medium and disposed at the Brewster angle with respect to said axis, at least one of said windows comprising a plano-convex lens with the convex surface disposed external to the maser medium, said lens having bi-cylindrical surface curvature.

9. The maser according to claim 8 in which said lens is characterized by a single focal length parallel to said axis equal to the window separation therealong.

10. An optical maser comprising an elongated optically resonant cavity having axial light beam reflective end members forming the extremities thereof, means for abstracting energy from said resonant cavity, an elongated negative temperature medium having an axis normal to said end members disposed in a portion of the volume between said end members, means for applying pump energy to said medium for establishing a population inversion therein, said negative temperature medium being bounded at the axial extremities thereof by energy transparent members inclined at the Brewster angle $\theta$ with respect to said axis, said energy transparent members comprising convergent focusing members having focal lengths along the axis of zero angle incidence related by $\cos^2 \theta$.

11. The maser according to claim 10 in which said focusing members have focal lengths along the axis of said negative temperature medium equal to the length of said medium along the axis thereof.

12. The maser according to claim 10 in which said focusing members are plano-convex lenses and the convex surfaces thereof have bi-cylindrical curvature.

References Cited in the file of this patent

UNITED STATES PATENTS 3,055,257   Boyd et al. _____ Sept. 25, 1962

OTHER REFERENCES

Vienot: Les Masers Optiques, Revue d'Optique, vol. 40, No. 1, January 1961, pp. 19 and 20.

Rigrod et al.: Gaseous Optical Maser With External Concave Mirrors, Journal of Applied Physics, vol. 33, No. 2, February 1962, pp. 743 and 744.